(12) United States Patent
Arao et al.

(10) Patent No.: US 10,896,777 B2
(45) Date of Patent: Jan. 19, 2021

(54) SOLENOID

(71) Applicant: DENSO CORPORATION, Kariya (JP)

(72) Inventors: Masashi Arao, Kariya (JP); Atsushi Ota, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/086,336

(22) PCT Filed: Feb. 28, 2017

(86) PCT No.: PCT/JP2017/007592
§ 371 (c)(1),
(2) Date: Sep. 19, 2018

(87) PCT Pub. No.: WO2017/187761
PCT Pub. Date: Nov. 2, 2017

(65) Prior Publication Data
US 2019/0096556 A1 Mar. 28, 2019

(30) Foreign Application Priority Data

Apr. 28, 2016 (JP) .................................. 2016-91264

(51) Int. Cl.
| | | |
|---|---|---|
| *H01F 7/00* | (2006.01) | |
| *H01F 7/129* | (2006.01) | |
| *F16K 31/06* | (2006.01) | |
| *H01F 7/128* | (2006.01) | |
| *H01F 7/06* | (2006.01) | |
| *H01F 7/08* | (2006.01) | |
| *H01F 7/16* | (2006.01) | |

(52) U.S. Cl.
CPC .............. *H01F 7/129* (2013.01); *F16K 31/06* (2013.01); *F16K 31/0675* (2013.01); *H01F 7/06* (2013.01); *H01F 7/081* (2013.01); *H01F 7/128* (2013.01); *H01F 7/16* (2013.01); *H01F 2007/086* (2013.01)

(58) Field of Classification Search
CPC .......... H01H 7/16; H01H 7/081; H01H 7/129; H01F 2007/086; F16K 31/0675
USPC ....................................................... 335/278
See application file for complete search history.

(56) References Cited

U.S. PATENT DOCUMENTS 2,407,963 A * 9/1946 Persons ..................... H01F 7/13
335/261
2,794,178 A * 5/1957 Reynolds ............. H01H 51/288
335/107

(Continued)

FOREIGN PATENT DOCUMENTS

JP     2003-314731     11/2003

*Primary Examiner* — Shawki S Ismail
*Assistant Examiner* — Lisa N Homza
(74) *Attorney, Agent, or Firm* — Nixon & Vanderhye P.C.

(57) ABSTRACT

A shaft outputs a thrust force in an axial direction by using a magnetic flux caused by an electric current flowing through a coil. A housing is made of resin and retains the shaft. The housing has a base portion having an outer circumferential surface, which is configured to be entirely in contact tightly with a sealing member. The housing further has a distal portion having an outer circumferential surface defining a depression. The outer circumferential surfaces of the base portion and the distal portion are substantially equal in diameter and are formed continuously.

15 Claims, 6 Drawing Sheets

(56) References Cited

U.S. PATENT DOCUMENTS

| | | | | |
|---|---|---|---|---|
| 3,229,171 | A * | 1/1966 | Daugherty | H01F 7/145 335/272 |
| 3,727,160 | A * | 4/1973 | Churchill | F16B 21/16 335/251 |
| 3,812,440 | A * | 5/1974 | Cook | H01H 50/32 335/167 |
| 4,093,931 | A * | 6/1978 | Fenton | H01F 7/145 335/272 |
| 4,782,315 | A * | 11/1988 | Bataille | H01H 51/2209 335/234 |
| 4,956,623 | A * | 9/1990 | Kimpel | H01H 50/60 335/128 |
| 5,268,662 | A * | 12/1993 | Uetsuhara | H01F 7/1615 335/229 |
| 5,631,613 | A * | 5/1997 | Niimi | H01H 51/065 335/126 |
| 5,892,194 | A * | 4/1999 | Uotome | H01H 1/34 218/68 |
| 5,959,519 | A * | 9/1999 | Gobel | H01F 7/1615 335/132 |
| 6,911,884 | B2 * | 6/2005 | Uotome | H01H 47/06 335/132 |
| 6,943,655 | B1 * | 9/2005 | McMahon | H01H 1/5855 335/131 |
| 7,852,178 | B2 * | 12/2010 | Bush | H01H 51/2209 335/126 |
| 7,859,373 | B2 * | 12/2010 | Yamamoto | H01H 50/305 335/126 |
| 7,876,183 | B2 * | 1/2011 | Uruma | H01H 50/04 335/126 |
| 8,136,790 | B2 * | 3/2012 | Hoppe | F01L 1/34 251/129.15 |
| 8,138,863 | B2 * | 3/2012 | Tanaka | H01H 1/54 335/126 |
| 8,138,872 | B2 * | 3/2012 | Yoshihara | H01F 7/1615 335/281 |
| 8,164,404 | B2 * | 4/2012 | Kamiya | H01H 9/04 218/157 |
| 8,198,964 | B2 * | 6/2012 | Yoshihara | H01H 51/29 335/131 |
| 8,350,652 | B2 * | 1/2013 | Hoppe | F01L 1/3442 310/12.31 |
| 8,395,463 | B2 * | 3/2013 | Ito | H01H 9/34 335/78 |
| 8,461,950 | B2 * | 6/2013 | Lim | H01H 50/546 335/126 |
| 8,487,722 | B2 * | 7/2013 | Mills | H01H 50/12 335/185 |
| 8,549,734 | B2 * | 10/2013 | Yeon | H01H 49/00 218/118 |
| 8,558,648 | B2 * | 10/2013 | Choi | H01H 51/065 200/245 |
| 8,760,247 | B2 * | 6/2014 | Isozaki | H01H 9/443 335/131 |
| 8,928,436 | B2 * | 1/2015 | Hirabayashi | H01H 51/065 335/131 |
| 8,937,518 | B2 * | 1/2015 | Suzuki | H01H 9/443 335/126 |
| 8,941,453 | B2 * | 1/2015 | Yano | H01H 50/60 335/131 |
| 2004/0257185 | A1 * | 12/2004 | Telep | H01F 7/13 335/220 |
| 2005/0161887 | A1 | 7/2005 | Hisamoto | |
| 2007/0279164 | A1 * | 12/2007 | Melodia | H02K 25/00 335/133 |
| 2008/0245983 | A1 | 10/2008 | Hoppe et al. | |
| 2009/0039992 | A1 * | 2/2009 | Ryuen | H01F 7/081 335/255 |
| 2009/0051471 | A1 * | 2/2009 | Zhao | H01F 7/1607 335/261 |
| 2009/0322453 | A1 * | 12/2009 | Kawaguchi | H01F 7/1615 335/81 |
| 2011/0248805 | A1 * | 10/2011 | Hamaoka | F16K 27/029 335/278 |
| 2013/0021121 | A1 * | 1/2013 | Uchida | H01H 51/065 335/131 |
| 2013/0021122 | A1 * | 1/2013 | Uchida | H01H 1/54 335/131 |
| 2013/0257567 | A1 * | 10/2013 | Takaya | H01H 50/163 335/133 |
| 2014/0026836 | A1 | 1/2014 | Matsumoto et al. | |
| 2014/0028423 | A1 | 1/2014 | Matsumoto et al. | |
| 2014/0232489 | A1 * | 8/2014 | Kubono | H01H 9/36 335/83 |
| 2014/0299804 | A1 * | 10/2014 | Arao | F16K 31/0675 251/129.15 |
| 2015/0015350 | A1 * | 1/2015 | Tachikawa | H01H 50/18 335/131 |
| 2015/0022291 | A1 * | 1/2015 | Kashimura | H01H 50/546 335/131 |
| 2015/0022292 | A1 * | 1/2015 | Tachikawa | H01H 49/00 335/131 |
| 2015/0076930 | A1 | 3/2015 | Kondo | |
| 2015/0198101 | A1 | 7/2015 | Nishimoto et al. | |
| 2015/0318134 | A1 * | 11/2015 | Connell | H01H 1/54 335/133 |
| 2015/0357107 | A1 * | 12/2015 | Fochtman | H01F 7/13 417/53 |
| 2017/0033628 | A1 * | 2/2017 | Arao | H02K 3/04 |

\* cited by examiner

FIG. 3
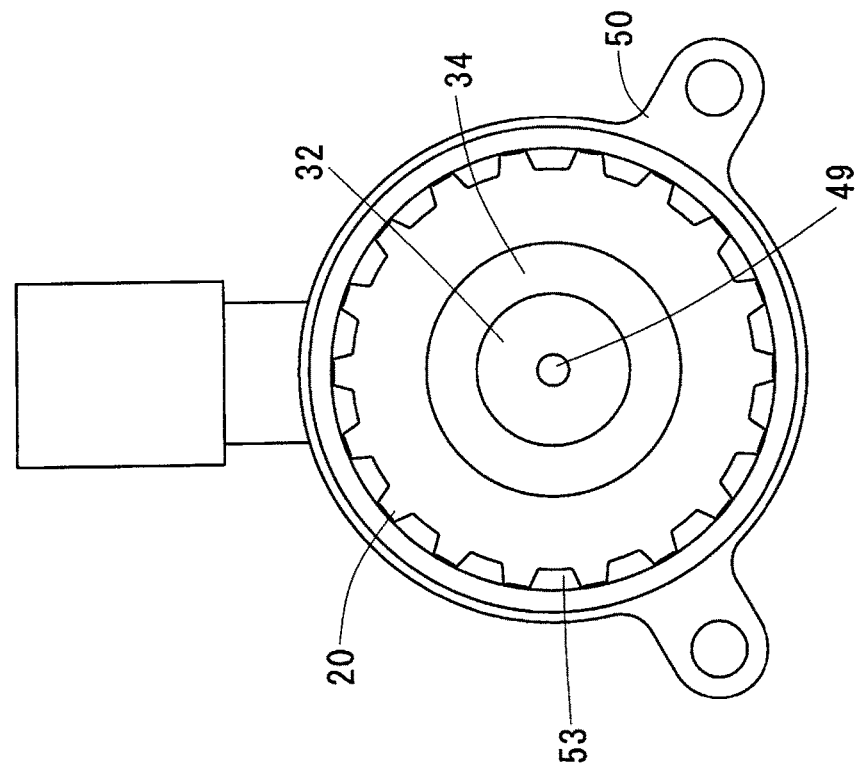
(b)
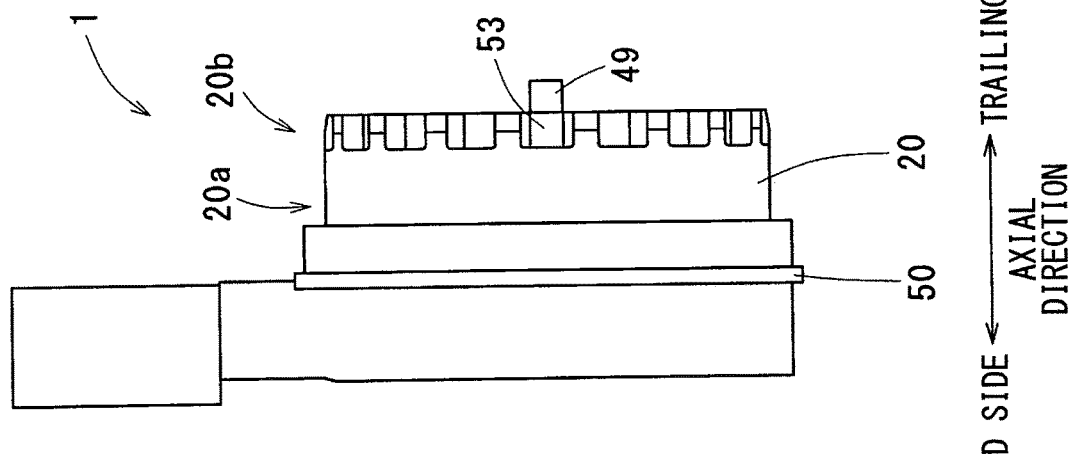
(a)
LEADING END SIDE ← AXIAL DIRECTION → TRAILING END SIDE

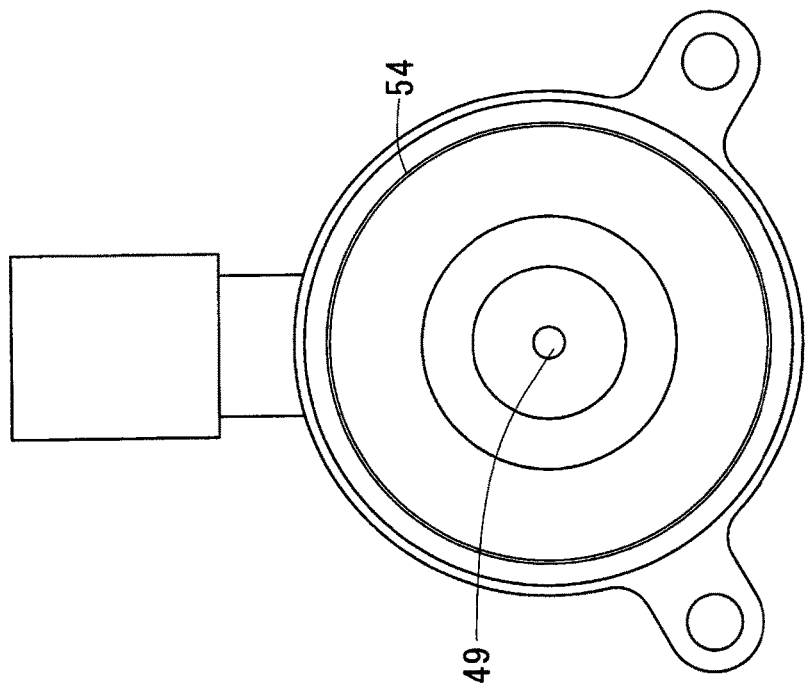
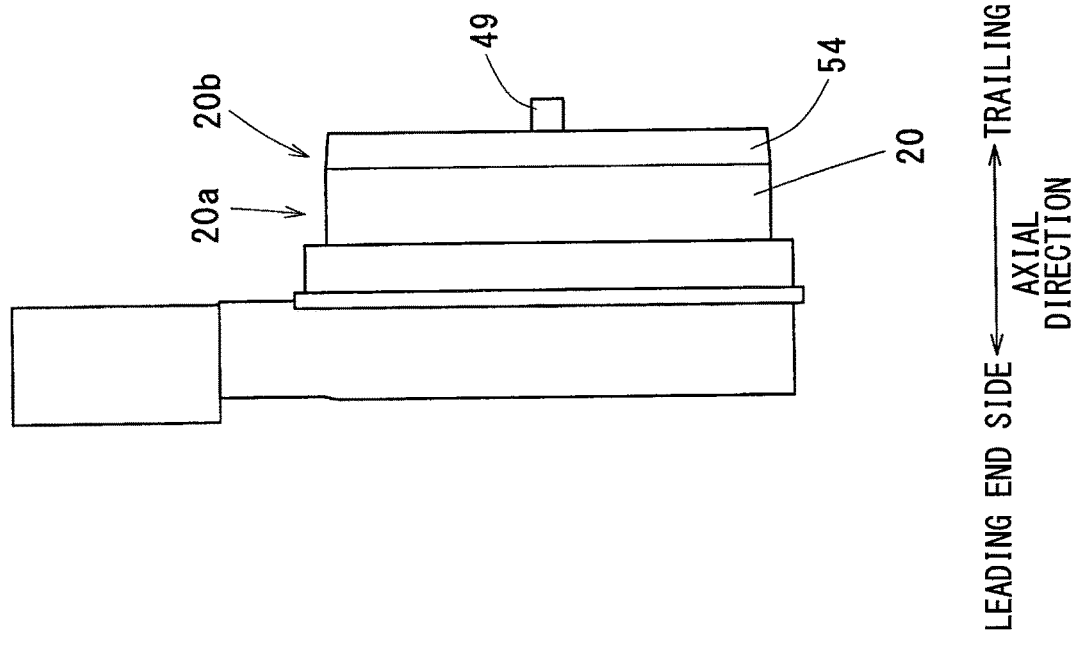
FIG. 4

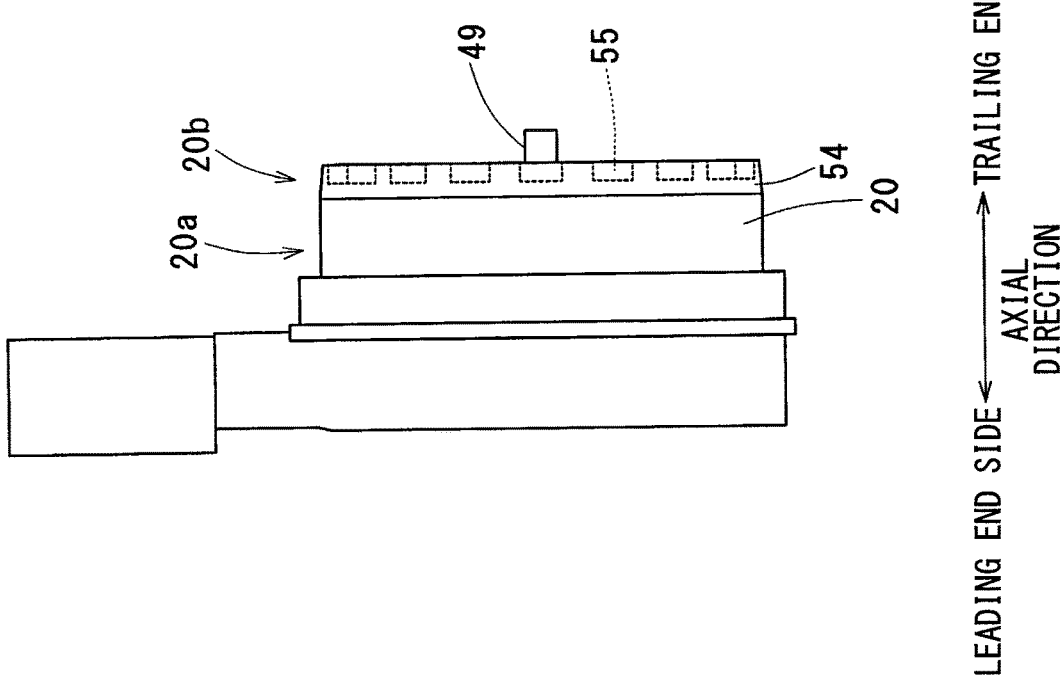

SOLENOID

CROSS REFERENCE TO RELATED APPLICATION

This application is the U.S. national phase of International Application No. PCT/JP2017/007592 filed on Feb. 28, 2017, which designated the U.S. and claims priority to Japanese Patent Application No. 2016-91264 filed on Apr. 28, 2016, the entire contents of each of which are incorporated herein by reference.

TECHNICAL FIELD

The present disclosure relates to a solenoid configured to output a thrust force in an axial direction.

BACKGROUND ART

Known conventional solenoids include a linear solenoid that outputs a thrust force using a magnetic flux caused by an electric current flowing through a coil, and are used in, for example, a vehicle. A known linear solenoid includes an outer circumferential yoke that is located on the outer circumference side of a coil and is exposed to the outside (for example, see Patent Literature 1). In such configurations, the outer circumferential yoke defines the outermost circumferential surface of the linear solenoid. In a case where a shaft, which is driven by using the outer circumferential yoke, is exposed to a hydraulic fluid or the like, the outer circumferential yoke is also exposed to the hydraulic fluid or the like. As a result, the hydraulic fluid or the like may flow around the outer circumferential yoke and may leak to the outside. To restrict such leaks, a sealing mechanism is required on the inner side of the outer circumferential yoke. Consequently, a concern would arise to complicate its seal structure.

As a measure, a configuration has been proposed in which the outer circumferential yoke is covered with a resin housing to restrict a hydraulic fluid or the like from flowing around the outer circumferential yoke and from leaking to the outside (for example, see Patent Literature 2). In this case, since the outer circumferential yoke is covered with the housing and thus does not define the outermost circumferential surface, this configuration could eliminate the requirement to provide a sealing mechanism on the inner side of the outer circumferential yoke and thereby could simplify the seal structure.

This configuration, however, would raise a concern of the hydraulic fluid or the like flowing on the resin housing and leaking to the outside and could thus require a sealing member, such as a rubber O-ring, to be placed on the outer circumferential surface of the resin housing to provide a seal. A linear solenoid, which is press-fitted in a through hole or the like of a casing in which an O-ring is provided, is taken as an example here. In this case, press-fitting of the linear solenoid in a state where the O-ring is in contact with the housing may necessitate a significant force because of a significant coefficient of friction between the resin and the rubber.

PRIOR TECHNICAL LITERATURE

Patent Literature

PATENT LITERATURE 1: JP 2009-511837 A
PATENT LITERATURE 2: JP 5720637 B2

SUMMARY OF INVENTION

It is an object of the present disclosure to provide a solenoid including a housing, which is made of resin, and having a structure configured to reduce a press-fitting load required to move the housing through a sealing member.

According to one aspect of the present disclosure, a solenoid comprises a shaft configured to output a thrust force in an axial direction by using a magnetic flux caused by an electric current flowing through a coil. The solenoid further comprises a housing made of resin in a tubular shape and retaining the shaft. The housing has a base portion having an outer circumferential surface, which is configured to be entirely in contact tightly with a sealing member, and a distal portion having an outer circumferential surface defining a depression. The outer circumferential surfaces of the base portion and the distal portion are substantially equal in diameter and are formed continuously.

According to one aspect of the present disclosure, a solenoid comprises a shaft configured to output a thrust force in an axial direction by using a magnetic flux caused by an electric current flowing through a coil. The solenoid further comprises a housing made of resin in a tubular shape and retaining the shaft. The housing has a base portion having an outer circumferential surface, which is configured to be entirely in contact tightly with a sealing member, and a distal portion having an outer circumferential surface as a tapered surface reduced in diameter gradually toward an end. The outer circumferential surfaces of the base portion and the distal portion are substantially equal in diameter and are formed continuously.

BRIEF DESCRIPTION OF THE DRAWINGS

The above and other objects, features and advantages of the present disclosure will become more apparent from the following detailed description made with reference to the accompanying drawings. In the drawings:

In FIG. 3, (a) is a side view of the linear solenoid (first embodiment), and (b) is a front view of the linear solenoid (first embodiment);

In FIG. 4, (a) is a side view of a linear solenoid (second embodiment), and (b) is a front view of the linear solenoid (second embodiment);

In FIG. 5, (a) is a side view of a linear solenoid (third embodiment), and (b) is a front view of the linear solenoid (third embodiment)

DESCRIPTION OF EMBODIMENTS

Embodiments of the present disclosure will be described below. The embodiments are presented in order to provide examples and should not be construed as limiting the scope of the present disclosure.

First Embodiment

Figure 1:
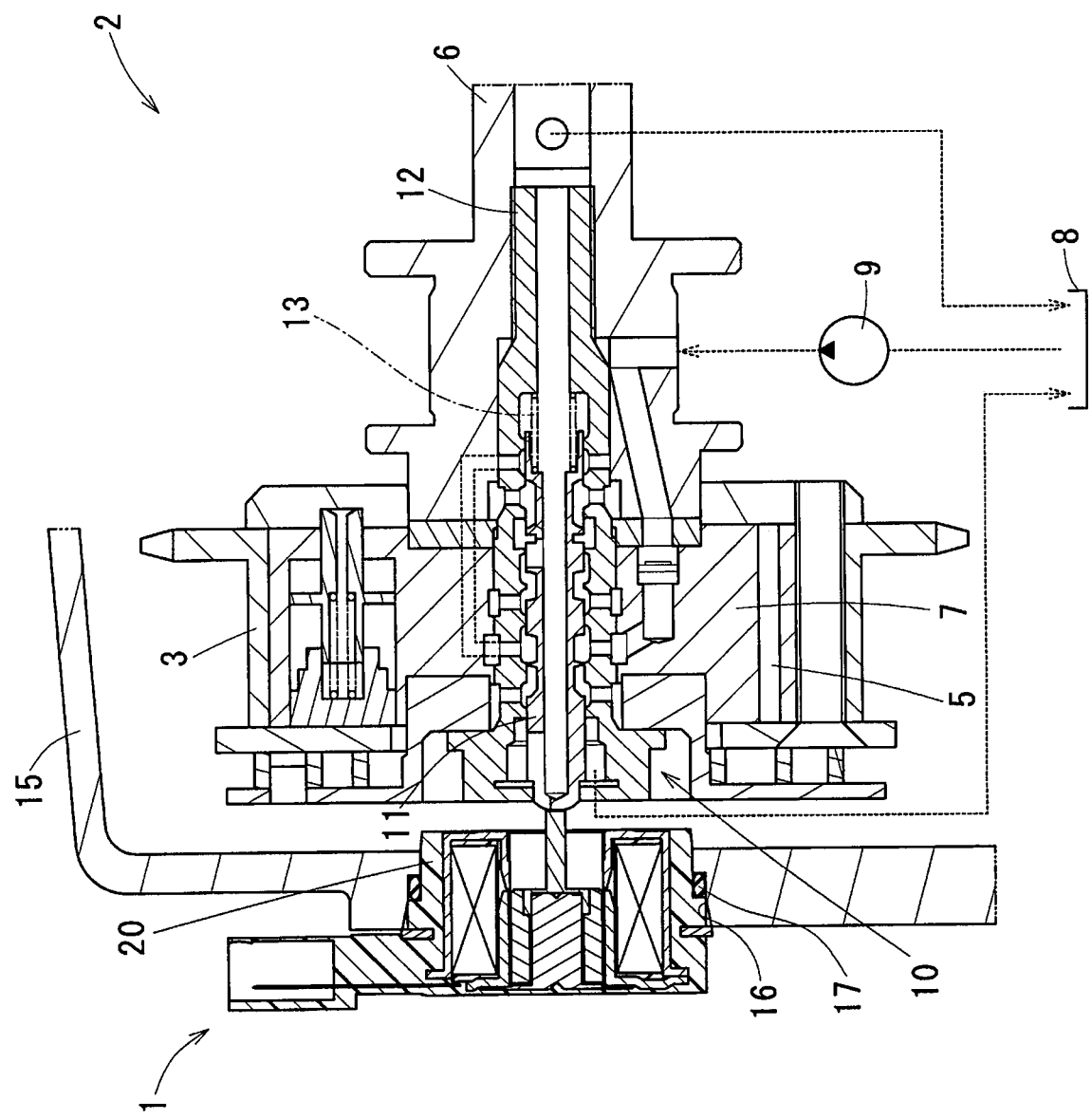
FIG. 1 is an overall configuration diagram of a valve timing adjusting apparatus (first embodiment)

A valve timing adjusting apparatus 2 that includes a linear solenoid 1 according to a first embodiment will be described below with reference to FIG. 1. The valve timing adjusting apparatus 2 supplies a hydraulic fluid to a hydraulic chamber 5 placed in a case 3. The case 3 is rotated together with a crankshaft of an internal combustion engine (not shown) to cause a vane rotor 7 that is rotated together with a camshaft 6 to perform a relative rotation, thereby adjusting opening/closing timings of intake and exhaust valves (not shown).

The hydraulic fluid is forced out of an oil pan 8 by using an oil pump 9 and is supplied to the hydraulic chamber 5 via a hydraulic switching valve 10. The hydraulic switching valve 10 includes a spool 11 that is configured to reciprocate in a sleeve 12. The spool 11 is biased to one side by a spring 13. The linear solenoid 1 is located on the one side of the spool 11 and moves the spool 11 toward the other side against a biasing force of the spring 13.

The linear solenoid 1 is mounted on a side face of a casing 15 that retains components such as the hydraulic switching valve 10 therein. Specifically, the linear solenoid 1 is affixed to the casing 15 by being press-fitted in a through hole 16, which is formed in the side face of the casing 15, from the left side to the right side in the drawing plane and by being fastened to the side face of the casing 15 using a fastener such as a bolt. An O-ring 17 is located on an inner circumferential surface of the through hole 16. The O-ring 17 is a sealing member that is in contact tightly with an outer circumferential surface of the linear solenoid 1 to seal a gap between the casing 15 and the linear solenoid 1, thereby to restrict the hydraulic fluid from leaking from the casing 15 to the outside.

The linear solenoid 1 includes a housing 20 that is in direct contact with the O-ring 17. The housing 20, which is made of resin in a tubular shape, has the outer circumferential surface having a diameter substantially equal to an inner diameter of the O-ring 17. The O-ring 17 is provided on the casing 15; the linear solenoid 1 has no groove or the like for retaining the O-ring 17. As used herein, an axial direction of the housing 20 is referred to as the axial direction, a side of the linear solenoid 1 that comes in contact with the spool 11 is referred to as a leading end side, and a side of the linear solenoid 1 that does not make contact with the spool 11 is referred to as a trailing end side.

Figure 2:
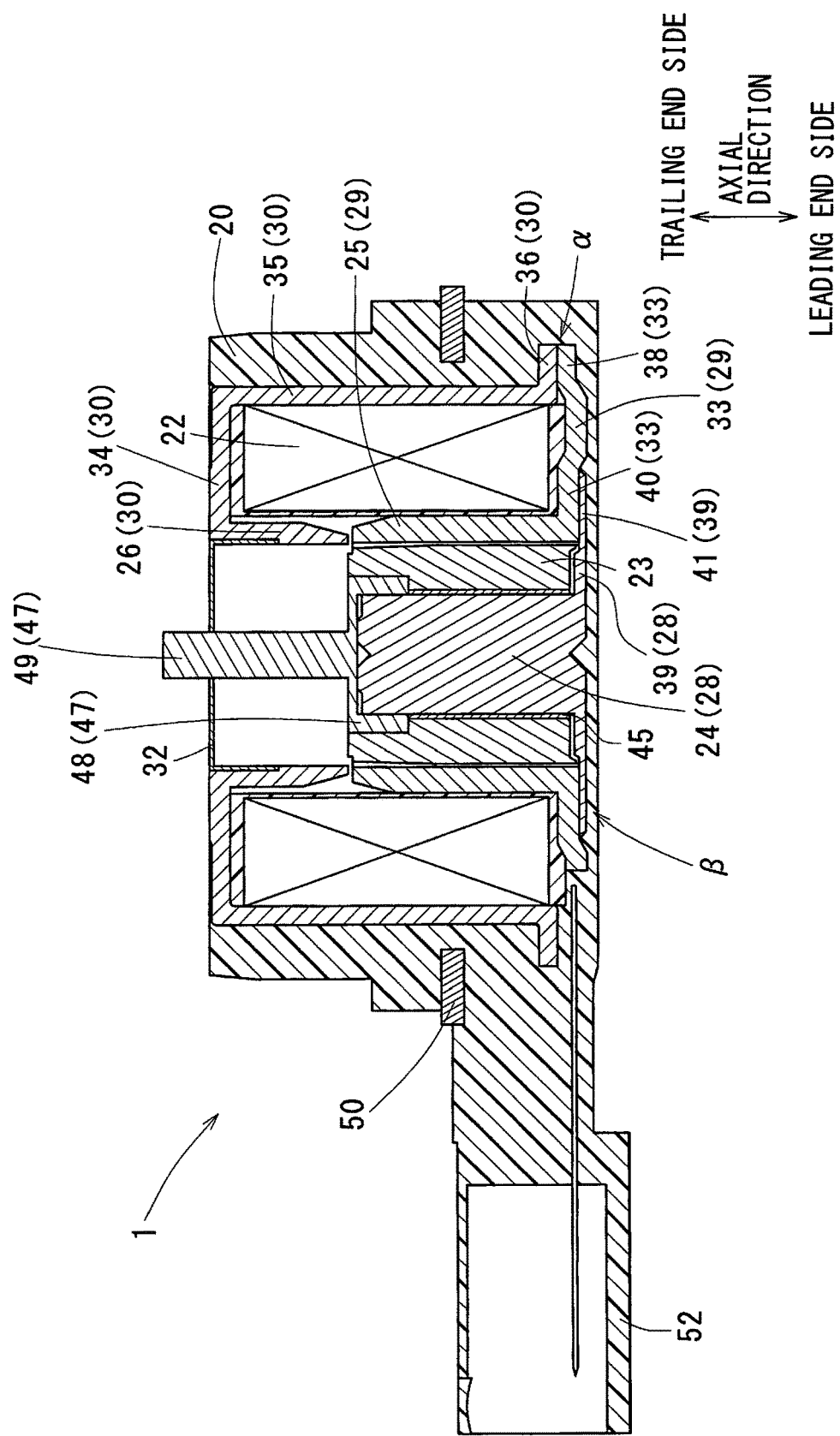
FIG. 2 is an overall configuration diagram of a linear solenoid (first embodiment)

A configuration of the linear solenoid 1 according to the first embodiment will be described below with reference to FIG. 2. The linear solenoid 1 generates a magnetic force of attraction using a magnetic flux produced when an electric current flows through a coil 22 and outputs the force of attraction as a thrust force. The linear solenoid 1 includes a movable element 23 and first, second, and third stators 24, 25, and 26, which are related to the magnetic force of attraction and to be described below.

The movable element 23 is a magnetic body in a tubular shape and is located on an inner circumference side of the coil 22. The movable element 23 is coaxial with the coil 22 and is movable in the axial direction. The movable element 23 has a breather passageway (not shown) that passes through the movable element 23 in the axial direction and that allows fluid to flow between the leading end side and the trailing end side.

The first stator 24 is in a cylindrical shape and is a part of a first magnetic body 28, which is one of affixed components. The first stator 24 is located on an inner circumference side of the movable element 23 and supports the movable element 23 from the inner circumference side slidably in the axial direction. The first stator 24 transfers the magnetic flux in a radial direction to the movable element 23.

The second stator 25 is in a tubular shape and is a part of a second magnetic body 29, which is a different magnetic body from the first magnetic body 28. The second stator 25 is located on an outer circumference side of the movable element 23, so that the movable element 23 is interposed, in the radial direction, between the first stator 24 and the second stator 25. The second stator 25 transfers the magnetic flux in the radial direction to the movable element 23. The second stator 25 has an inner circumferential surface that has a predefined gap in the radial direction with an outer circumferential surface of the movable element 23. The movable element 23 moves in the axial direction without making sliding contact with the second stator 25.

The third stator 26 is in a tubular shape and is a part of a third magnetic body 30, which is a different magnetic body from the first and second magnetic bodies 28 and 29. The third stator 26 is coaxial with the second stator 25 and is located away from the second stator 25 toward the leading end side. When the magnetic flux is produced, the third stator 26 magnetically attracts the movable element 23 in such a manner that the movable element 23 moves toward the leading end side until the movable element 23 moves to a proximate position to an inner circumferential surface of the third stator 26.

The third stator 26 has an opening that defines an inner circumference of the third stator 26 on the leading end side, and the opening is blocked by a cover 32, which is a different magnetic body from the first to third magnetic bodies 28 to 30. The cover 32, which is in a tubular shape having a closed end portion, is for restricting entry of foreign matter into the linear solenoid 1 from the outside. The entry of foreign matter is restricted mainly by the closed end portion. The cover 32 has a tubular portion that is press-fitted into the inner circumference side of the third stator 26. The tubular portion contributes to an increased area for transferring the magnetic flux.

The linear solenoid 1 has first and second transfer structures α and β, to be described below, for transferring the magnetic flux between the first, second, and third magnetic bodies 28, 29, and 30. The first transfer structure α is a structure to transfer the magnetic flux in which a magnetic portion of the second magnetic body 29 that is different from the second stator 25 is in contact with a magnetic portion of the third magnetic body 30 that is different from the third stator 26.

The second magnetic body 29 includes a trailing end yoke 33 that extends from a trailing end of the second stator 25 toward an outer circumference side of the second stator 25 and covers a trailing end side of the coil 22. The trailing end yoke 33 is in an annular disk shape. The third magnetic body 30 includes a leading end yoke 34 and an outer circumferential yoke 35. The leading end yoke 34 extends from a leading end of the third stator 26 toward an outer circumference side of the third stator 26 and covers a leading end side of the coil 22. The leading end yoke 34 is in an annular disk shape. The outer circumferential yoke 35 extends from an outer circumferential edge of the leading end yoke 34 toward the trailing end side and covers an outer circumference side of the coil 22. The outer circumferential yoke 35 is in a tubular shape. The third magnetic body 30 further includes a flange portion 36 that extends from a trailing end of the outer circumferential yoke 35 toward an outer circumference side of the outer circumferential yoke 35. The flange portion 36 is in an annular disk shape. The first transfer structure α transfers magnetic flux through an outer circumferential portion 38 of the trailing end yoke 33 and the flange portion 36, which are in surface contact with each other.

The second transfer structure β is a structure to transfer magnetic flux in which a magnetic portion of the first magnetic body 28 that is different from the first stator 24 is in contact with a magnetic portion of the second magnetic body 29 that is different from the second stator. The first magnetic body 28 includes a flange portion 39 that extends from a trailing end of the first stator toward an outer circumference side of the first stator. The flange portion 39 is in an annular disk shape. The second transfer structure β transfers magnetic flux through an inner circumferential portion 40 of the trailing end yoke 33 and an outer circumferential portion 41 of the flange portion 39, which are in surface contact with each other.

The linear solenoid 1 further includes a bearing 45 and an output member 47, which are to be described below. The bearing 45, which is affixed to an inner circumference of the movable element 23, is in direct sliding contact with the first stator 24, so that the movable element 23 is in indirect sliding contact with the first stator 24 via the bearing 45. The bearing 45 has an outer circumferential portion that is made using a magnetic body and an inner circumferential portion that is made of a non-magnetic material. An inner circumferential surface of the bearing 45, which is in direct sliding contact with an outer circumferential surface of the first stator 24, is made using a non-magnetic material.

The output member 47, which is made of a non-magnetic material, is affixed to the movable element 23 and moves together with the movable element 23 toward the leading end to output a thrust force. The output member 47 receives a restoring force from an external device, which is, for example, the spool 11, and moves together with the movable element 23 to the trailing end side due to the restoring force. The output member 47 has a securing portion 48, which is in a tubular shape and is affixed to the movable element 23 coaxially, and a shaft 49, which is in a cylindrical shape that extends to the leading end side.

The linear solenoid 1 is made by injecting molten resin on the coil 22, the first to third magnetic bodies 28 to 30, a mounting bracket 50, and the like and subjecting the resin to molding. The injected molten resin is further formed into the housing 20, a connector 52, and the like. The housing 20 covers an outer circumferential side of the outer circumferential yoke 35 and an outer circumferential portion of the leading end yoke 34. Molding dies used for the molding is configured to split in the axial direction and thus leaves no parting line on the outer circumferential surface of the housing 20.

Characteristic of First Embodiment

A characteristic configuration of the linear solenoid 1 according to the first embodiment will be described below with reference to (a) and (b) in FIG. 3. The housing 20 has a base portion 20a having an outer circumferential surface that is to be entirely in contact tightly with the O-ring 17, which is made of rubber, and a distal portion 20b having an outer circumferential surface that has a depression 53. In this case, a plurality of depressions 53 is provided. Each of the depressions 53 has an open end and thus poses no obstacle to releasing of the molding dies in the axial direction.

The outer circumferential surfaces of the distal portion 20b and the base portion 20a are substantially equal in diameter and are formed continuously. The distal portion 20b may be described, in relation to placement of the housing 20 and the O-ring 17, as a portion of the housing 20 over which the O-ring 17 passes first before the O-ring 17 is placed on the base portion 20a. That is, the base portion 20a and the distal portion 20b are defined in relation to the placement of the O-ring 17.

Effect of First Embodiment

The housing 20 has the base portion 20a having the outer circumferential surface that is to be entirely in contact tightly with the O-ring 17, which is made of rubber, and the distal portion 20b having the outer circumferential surface that has the depressions 53. The outer circumferential surfaces of the distal portion 20b and the base portion 20a are substantially equal in diameter and are formed continuously.

When the linear solenoid 1 is installed into the through hole 16 or the like of the casing 15 in which the O-ring 17 is provided, the depressions 53 provided in the outer circumferential surface of the distal portion 20b do not make contact with the O-ring 17 and is thus capable to reduce the contact portion between the housing 20 and the O-ring 17. Additionally, each portion of the O-ring 17 that straddles one of the depressions 53 is inhibited from expanding in diameter. Consequently, a compressive force of the O-ring 17, which would be caused by expansion of the diameter of the O-ring 17, can be reduced. Thus, a press-fitting load to move the linear solenoid 1, which includes the housing 20 made of resin, through the O-ring 17 can be reduced.

A part of the distal portion 20b that have no depressions 53 serve as a guide during the press-fitting. Since the outer circumferential surfaces of the distal portion 20b and the base portion 20a are substantially equal in diameter and are formed continuously, the O-ring 17 can be lead to the base portion 20a with ease.

Characteristic of Second Embodiment

A linear solenoid 1 according to a second embodiment will be described below with reference to (a) and (b) in FIG. 4 and with a focus on a difference from the first embodiment. In following embodiments, functional components identical with those in the first embodiment are designated with identical symbols.

A housing 20 has a base portion 20a having an outer circumferential surface that is to be entirely in contact tightly with an O-ring 17, which is made of rubber, and a distal portion 20b having a tapered surface 54 that is an outer circumferential surface of the distal portion 20b reduced in diameter gradually toward an end. The outer circumferential surfaces of the base portion 20a and the distal portion 20b are substantially equal in diameter and are formed continuously.

This configuration gently increases a compressive force of the O-ring 17 that is caused by expansion of the diameter of the O-ring 17; thus, the press-fitting load can be inhibited from rapidly increasing and thereby can be reduced. An outer circumference diameter of the end of the distal portion 20b may be substantially equal to an inner circumference diameter of the O-ring 17 in order for the distal portion 20b to serve as the guide during the press-fitting.

Characteristic of Third Embodiment

A linear solenoid 1 according to a third embodiment will be described below with reference to (a) and (b) in FIG. 5 and with a focus on a difference from the second embodiment. A distal portion 20b of a housing 20 defines depressions 55.

This configuration increases a surface area of the housing 20, thereby enabling an enhanced cooling effect. Thus, the linear solenoid 1 is enabled to produce an increased cooling efficiency and thereby to reduce thermal damage which would arise in a coil 22 and the like. The depressions 55 in the third embodiment are formed in the axial direction in an end of the distal portion 20b, which is apt to come into contact with the hydraulic fluid. When molding dies used for the molding is configured to split in the axial direction, the depressions 55 can be formed in the distal portion 20b with greater ease.

(Modification)

Figure 6:
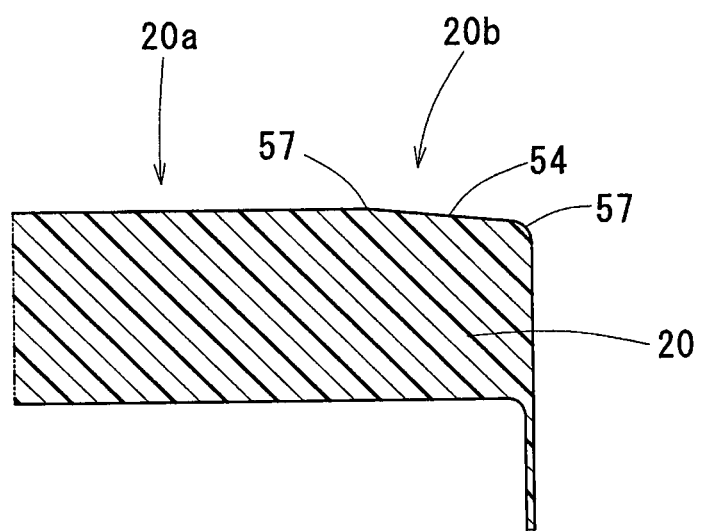
FIG. 6 is an enlarged view of a tapered surface (modification).

Various modifications of the present disclosure are possible within a scope not departing from the spirit of the present disclosure. While the tapered surface 54 has edges that are each coupled to another surface at an angle in the embodiments, the tapered surface 54 may be coupled to another surface smoothly via a curved surface portion 57 (see FIG. 6). This configuration reduces the rate of change in expansion of the diameter of the O-ring 17 in relation to the movement of a housing 20 in the axial direction, thereby facilitating the movement of the housing 20 through the O-ring 17.

A gradient angle of the tapered surface 54 with respect to a generating line of the base portion 20a may be 30 degrees or less to reduce the expansion of the diameter of the O-ring 17 and to serve as the guide for the O-ring 17.

While the linear solenoid 1 is used as a solenoid in the embodiments, this is not a limitation. For example, an on-off solenoid that varies the position of the output member 47 in accordance with turning on and off of the flow of an electric current may be used as a solenoid. While the O-ring 17 is used as a sealing member in the embodiments, this is not a limitation. For example, an X-ring seal that is made of rubber and has a cross section having an X shape or other seal may be used as a sealing member. That is, other types of sealing member having a ring shape provided for the purpose of sealing may be used.

The solenoid described above includes a housing, which is made of resin in a tubular shape and retains a shaft. The shaft outputs a thrust force in the axial direction by using a magnetic flux produced when an electric current flows through a coil. The housing described in one of the embodiments has a base portion having an outer circumferential surface, which is to be entirely in contact tightly with a sealing member, and a distal portion having an outer circumferential surface that defines a depression. The diameters of the outer circumferential surfaces of the base portion and the distal portion are substantially uniform and are continuous.

When the solenoid is installed in a through hole or the like of a casing in which the sealing member, such as an O-ring, is provided, the depressions provided in the outer circumferential surface of the distal portion do not make contact with the sealing member and thus can reduce portions of contact between the housing and the sealing member. Additionally, each portion of the sealing member that straddles one of the depressions is inhibited from expanding in length that is a portion of a diameter of the sealing member; thus, a compressive force of the sealing member that is entailed in the expansion of the diameter of the sealing member can be reduced. Thus, a press-fitting load to move the solenoid, which includes the housing made of resin, through the sealing member can be reduced. Portions of the distal portion that have no depressions serve as a guide during the press-fitting.

The distal portion may be described, in relation to placement of the housing and the sealing member, as a portion of the housing over which the sealing member passes first before the sealing member is placed on the base portion. The sealing member is configured to provide a seal; the diameter of the sealing member can be expanded to a certain degree but not excessively.

That the outer circumferential surfaces of the base portion and the distal portion are substantially equal in diameter and are formed continuously means that each of the distal portion and the base portion have no portion, in which the outer circumferential surface vary in diameter, such as grooves, except the tapered surface and the like. If such a portion like a groove is provided in the base portion and/or the distal portion, molding dies have to be split in the radial direction for releasing the mold. This would leave mold parting lines on the outer circumferential surfaces of the base portion and the distal portion, thereby leading to degradation in sealing performance. Additionally, adding a groove or the like in a separate process results in increase of the number of processes.

The housing described in some of the embodiments has a base portion having an outer circumferential surface that is entirely in contact tightly with the sealing member and a distal portion having a tapered surface that is an outer circumferential surface of the distal portion having diameters that are reduced gradually toward an end. The outer circumferential surfaces of the base portion and the distal portion are substantially equal in diameter and are formed continuously.

This configuration gently increases a compressive force of the sealing member that is entailed in the expansion of the diameter of the sealing member; thus, the press-fitting load can be inhibited from rapidly increasing and thereby can be reduced. An outer circumference diameter of the end of the distal portion may be substantially equal to an inner circumference diameter of the sealing member in order for the distal portion to serve as the guide during the press-fitting.

While the present disclosure has been described on the basis of some embodiments, the present disclosure is not limited to the embodiments or structures described herein. The present disclosure includes various modifications and equivalent modifications. Additionally, various combinations and configurations, as well as other combinations and configurations including more, less, or only a single element, are within the scope and spirit of the present disclosure.

The invention claimed is:

1. A solenoid comprising:
    a shaft configured to output a thrust force in an axial direction by using a magnetic flux caused by an electric current flowing through a coil; and
    a housing made of resin in a tubular shape and retaining the shaft, wherein
    the housing has a base portion having an outer circumferential surface, which is configured to be in contact tightly with a sealing member, and a distal portion having an outer circumferential surface defining a depression, and
    the outer circumferential surfaces of the base portion and the distal portion are substantially equal in diameter and are formed continuously.

2. The solenoid according to claim 1, wherein
    the depression defined in the outer circumferential surface of the distal portion extends in the axial direction, and
    the depression opens in the outer circumferential surface of the distal portion and further opens in a distal end surface of the distal portion in the axial direction.

3. The solenoid according to claim 1, wherein diameters of the outer circumferential surfaces of (i) the base portion, (ii) at least a part of the distal portion, and (iii) a portion of the housing extending entirely between the base portion and the at least a part of the distal portion in the axial direction are uniform.

4. The solenoid according to claim 3, wherein the outer circumferential surface of the distal portion includes another part which is tapered.

5. The solenoid according to claim 4, wherein the at least a part of the distal portion is closer to the base portion in the axial direction than the another part of the distal portion which is tapered.

6. The solenoid according to claim 1, wherein the sealing member is a rubber O-ring in direct contact with the outer circumferential surface of the base portion.

7. The solenoid according to claim 1, wherein the outer circumferential surface of the base portion is an outer circumferential side surface of the base portion, the outer circumferential side surface of the base portion being in direct contact with the sealing member.

8. A solenoid comprising:
- a shaft configured to output a thrust force in an axial direction by using a magnetic flux caused by an electric current flowing through a coil; and
- a housing made of resin in a tubular shape and retaining the shaft, wherein
- the housing has a base portion having an outer circumferential surface, which is configured to be in contact tightly with a sealing member, and a distal portion having an outer circumferential surface including (i) a tapered surface reduced in diameter gradually toward an end and (ii) another surface, and
- the outer circumferential surface of the base portion and the outer circumferential surface of the another surface of the distal portion are substantially equal in diameter and are formed continuously.

9. The solenoid according to claim 8, wherein the distal portion of the housing define at least one depression.

10. The solenoid according to claim 8, wherein
- the distal portion has a depression that extends in the axial direction, and
- the depression opens in the outer circumferential surface of the distal portion and further opens in a distal end surface of the distal portion in the axial direction.

11. The solenoid according to claim 8, wherein (i) the diameter of the outer circumferential surface of the base portion, (ii) the diameter of outer circumferential surface of the another surface of the distal portion, and (iii) the diameter of a portion of the housing extending entirely between the base portion and the another surface of the distal portion in the axial direction are uniform.

12. The solenoid according to claim 11, wherein the another surface of the distal portion is closer to the base portion in the axial direction than the tapered surface of the distal portion.

13. The solenoid according to claim 8, wherein the sealing member is a rubber O-ring in direct contact with the outer circumferential surface of the base portion.

14. The solenoid according to claim 8, wherein the outer circumferential surface of the base portion is an outer circumferential side surface of the base portion, the outer circumferential side surface of the base portion being in direct contact with the sealing member.

15. The solenoid according to claim 8, wherein the depression defined in the distal portion of the housing is defined in the outer circumferential surface of the distal portion of the housing.

\* \* \* \* \*